United States Patent [19]

Salmon et al.

[11] Patent Number: 4,505,075
[45] Date of Patent: Mar. 19, 1985

[54] FIXTURING DEVICE

[75] Inventors: Stuart C. Salmon; Larry D. Zeltner, both of Cincinnati, Ohio

[73] Assignee: General Electric Company, Cincinnati, Ohio

[21] Appl. No.: 495,278

[22] Filed: May 16, 1983

[51] Int. Cl.³ .............................................. B24B 49/10
[52] U.S. Cl. ................................ 51/165.75; 51/217 R; 51/277; 83/364; 29/156.8 B
[58] Field of Search ........... 51/165.74, 165.75, 217 A, 51/277; 83/364; 29/156.8 B

[56] References Cited

U.S. PATENT DOCUMENTS

| | | | |
|---|---|---|---|
| 2,607,421 | 8/1952 | Anderson | 83/364 |
| 3,160,870 | 12/1964 | Randall | 51/165.74 |
| 3,331,166 | 7/1967 | Brenning | 51/217 R |
| 3,667,334 | 6/1972 | Brunett | 83/364 |
| 4,128,929 | 12/1978 | DeMusis | 51/217 R |
| 4,397,205 | 8/1983 | Kirstein | 83/364 |

Primary Examiner—Harold D. Whitehead
Attorney, Agent, or Firm—Gregory A. Welte; Derek P. Lawrence

[57] ABSTRACT

The hysteresis of an inductive proximity probe is reduced by repeatedly switching off and on a feedback network in the probe which causes the hysteresis. Such a probe can be used in a fixturing device for the grinding of dovetails on gas turbine engine blades.

5 Claims, 5 Drawing Figures

FIXTURING DEVICE

The invention relates to fixturing devices for supporting workpieces during a machining operation and, more particularly, to such devices which ascertain the correct positioning of workpieces within the fixturing devices.

BACKGROUND OF THE INVENTION

Inductive proximity sensors commonly exhibit hysteresis. That is, they are triggered when an approaching conductive object crosses a known point in space, but they are not detriggered until the object reverses its approach and withdraws to a detrigger point farther away than the trigger point. That is, such sensors, once triggered, do not detect motion of the object within a region termed a hysteresis region located between the two points.

This causes problems when such sensors are used to ascertain the positioning of an object because they allow the object to move undetected within the hysteresis region. In some situations, greater detective precision than this is needed. For example, when a workpiece is clamped into a vise for a machining operation, and if such a sensor is used to ascertain whether the workpiece is positioned correctly, movement of the workpiece following triggering of the sensor may not be detected, resulting in faulty positioning. The problem is worsened when automated equipment is used because a human operator generally is not present to supervise the positioning of each workpiece. Accurate positioning of workpieces in fixtures is important in the gas turbine engine industry.

OBJECTS OF THE INVENTION

It is an object of the present invention to provide a new and improved inductive proximity probe.

It is a further object of the present invention to provide a new and improved inductive proximity probe having reduced hysteresis.

It is a further object of the present invention to provide a new and improved fixturing apparatus which ascertains the correct positioning of a workpiece within it.

It is a further object of the present invention to provide a new and improved fixturing device for automatically sensing the correct positioning of a gas turbine engine blade within it and, in response, clamping the blade into place for machining.

SUMMARY OF THE INVENTION

An invention is disclosed wherein the hysteresis of an inductive proximity probe is reduced by repeatedly switching off and on a feedback network in the probe which causes the hysteresis. Such a probe can be used in a fixturing device for the grinding of dovetails on gas turbine engine blades.

DETAILED DESCRIPTION OF THE INVENTION

Figure 1:
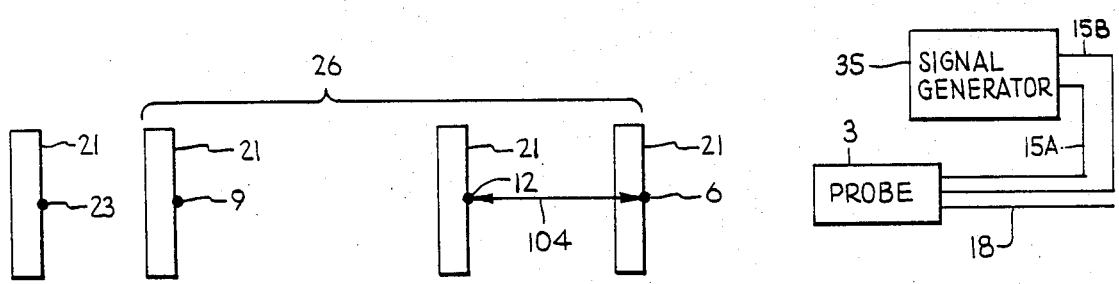
FIG. 1 depicts a hysteresis region of an inductive proximity probe.

FIG. 1 illustrates an inductive proximity sensor or probe 3. One such probe is Model No. BES-516-372-EO-X-019, manufactured by Balluff located in Neuhausen, West Germany. A trigger point 6 and a detrigger point 9 are identified, as is an intermediate point 12.

The probe 3 receives its operating power on leads 15A and 15B and produces an output signal on lead 18 in response to objects present at the trigger point 6.

One view of the hysteresis built into such a probe is the following. When an object 21 is present at a point 23, no triggering occurs and triggering is absent until the object 21 reaches the trigger point 6. At that time, triggering occurs, a signal is generated on lead 18, and the probe 3 remains triggered until the object 21 is withdrawn past the detrigger point 9. That is, when the object 21 is present at the intermediate point 12 following triggering, the probe 3 remains triggered. Thus, a hysteresis region 26 exists between points 6 and 9.

Two situations are now identified for later discussion: situation S1, in which the object 21 just crosses the trigger point 6 and then stops, and situation S2, in which the object 21 is withdrawn slightly from S1 to a point such as the intermediate point 12, but not so far as to reach the detrigger point 9.

Figure 2:
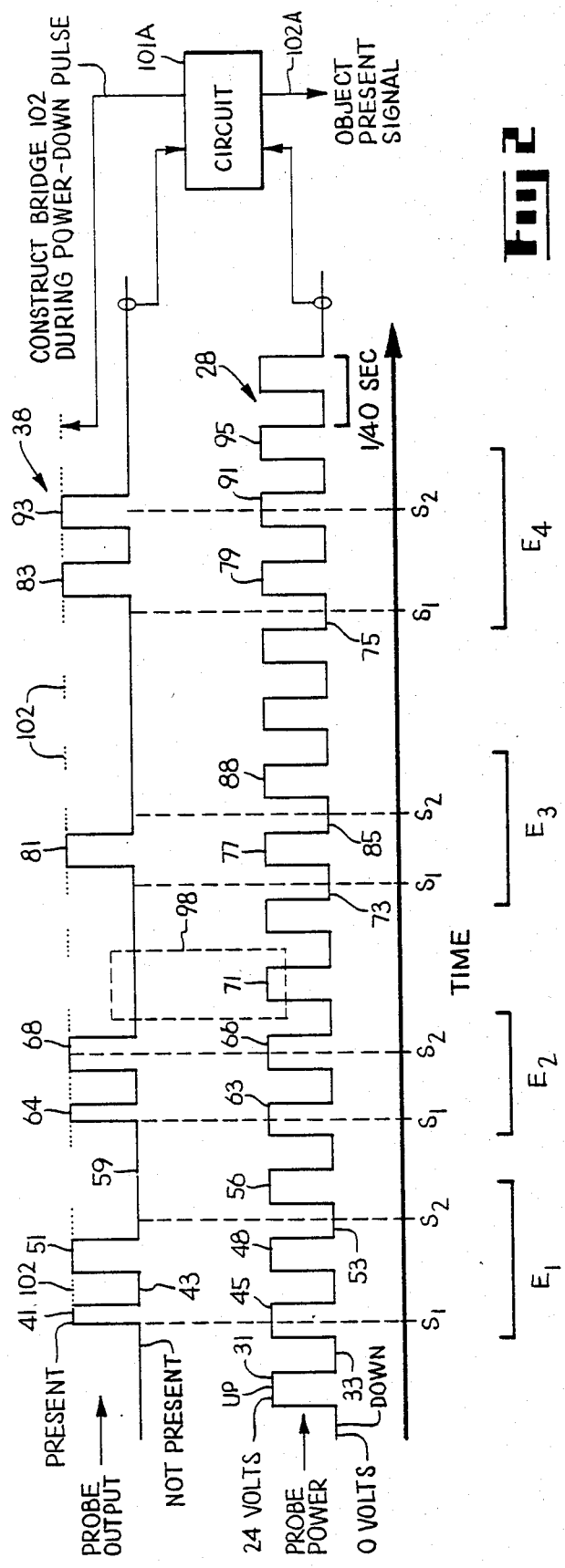
FIG. 2 depicts a wavetrain used to power an inductive proximity probe and a wavetrain of output pulses in one form of the present invention.

FIG. 2 illustrates four events E1–E4. Each event is defined by the occurrence of one of the situations S1 or S2 followed by the persistence of that situation until the other situation occurs. For example, E1 refers to the occurrence of S1 (that is, the reaching of the trigger point 6 by the object 21 in FIG. 1). The object 21 remains at the trigger point 6 until the occurrence of S12 (that is, the withdrawal by the object 21 to the intermediate point 12).

In addition, FIG. 2 illustrates a square wave 28 having an amplitude ranging from 0 to 24 volts and having a period of 1/40 second. The square wave 24 is considered to be composed of a sequence of pairs of pulses, each pair composed of a "power up" pulse 31 followed by a "power down" pulse 33. The square wave 28 is generated by a signal generator 35 in FIG. 1 which supplies the probe 3 with operating power on leads 15A and B. Thus, the probe 3 is switched on and off by the power supply at the rate of 40 Hz.

Plot 38 in FIG. 2 illustrates the output signal produced by the probe 3 in response to the situations S1 and S2. A positive signal 41 is produced by the probe 3 when triggered by an object 21 present at the trigger point 6 in FIG. 1. Consequently, the positive signal 41 is termed a trigger signal. A zero voltage signal 43 is produced when the probe 3 is detriggered, and such a signal ordinarily indicates that the object 21 has withdrawn from the trigger point 6 to the detrigger point 9. The positive signal 41 and the zero signal 43 can be viewed respectively as binary logic positive and zero signals. The information of FIG. 2 is plotted as a function of time.

In event E1, situation S1 occurs during a power-up pulse 45. Accordingly, the trigger signal 41 is simultaneously produced by the probe 3. The trigger signal 41 persists for the remainder of the power-up pulse 45, and disappears with the termination of the power-up pulse 45. The next power-up pulse, pulse 48, causes a reappearance of the trigger signal as signal 51, followed by disappearance of the trigger signal 51 at the termination of the power-up pulse 48. During the immediately ensuing power-down pulse 53, S2 occurs. However, this is not immediately detectable because the probe 3, in receiving no power at that time, produces no output signal. But, at the onset of the next power-up pulse 56, the trigger signal fails to appear: the logical zero output 59 indicates the occurrence of S2. Thus, the movement of the object 21 away from the trigger point 6 after triggering of the probe 3, but not so far as the detrigger point 12 (that is, the object 21 remains within the hysteresis region 26), is nevertheless detectable from the pulse 56 and the output signal 59. This will be further discussed later.

In event E2, as in E1, situation S1 occurs during a power-up pulse, namely, pulse 63, As in E1, the trigger signal 64 is simultaneously produced with S1, and the trigger signal persists until the termination of the power-up pulse 63, at which time the trigger signal 64 disappears. At the onset of the next power pulse 66, the trigger signal 68 reappears. However, unlike E1, in E2, S2 occurs during a power-up pulse, pulse 66. This causes no immediate termination of the trigger signal 68 because of hysteresis; provided, of course, that the motion of the object 21 does not carry the object 21 outside the hysteresis region 26. The trigger signal 68 persists until the termination of the power-up pulse 66. During the next power-up pulse, pulse 71, no trigger signal appears, and thus, during power-up pulse 71 the occurrence of S2 is detectable by the absence of a trigger signal.

In events E3 and E4, unlike events E1 and E2, situation S1 occurs during a power-down pulse, namely, pulses 73 and 75 respectively. In both E3 and E4 this causes no trigger signal to immediately occur. However, in both E3 and E4, at the onset of the next respective power-up pulses, pulses 77 and 79, respective trigger signals 81 and 83 occur. In E3, like E1, situation S2 occurs during a power-down pulse, pulse 85. No trigger signal is affected at that time because the probe 3 is unpowered. Further, no trigger signal (or, equivalently, a zero signal occurs) at the onset of the following power-up pulse, pulse 88. Thus, the occurrence of S2 is detectable.

In event E4, unlike E3, but like E2, situation S2 occurs during a power-up pulse, pulse 91. No disappearance of the trigger signal 93 immediately occurs because of hysteresis. Instead, the trigger signal 93 disappears with the termination of the power-up pulse 91 and fails to reappear with the onset of the following power-up pulse 95. At this time, S2 becomes detectable.

As the above description shows, the occurrence of S2, that is, the withdrawal of the object 21 from the trigger point 6, occurs either during a power-up pulse or a power-down pulse. In either case, the occurrence of S2 becomes detectable at the onset of the next power-up pulse. In the discussion above, using 40 Hz switching, the maximum delay in detecting the occurrence of S2 is 1/40 second (strictly, 1/40 minus an infinitesimally small number) because that length of time is the maximum possible between an event occurring during one power-up pulse and the onset of the next. (of course, the maximum delay between S2 occurring during a power-down pulse and detection at the onset of the next power-up pulse is 1/20 second.)

Accordingly, the withdrawal of the object 21 from the trigger point 6, but still remaining within the hysteresis region 26, is detectable from the combination of the square wave signals produced by the signal generator 35 and the trigger signals in plot 38. There is a maximum delay of less than 1/40 second between the occurrence of the withdrawal and the detectability. The withdrawal of the object 21 is inferred from the occurrence of a power-up signal without the appearance of a trigger signal, as in region 98 in FIG. 2.

Electronic circuitry known in the art can automatically detect the withdrawal of the object 21 based on the square wave 28 and the trigger signals. As an example, circuitry 101A in FIG. 2 has been constructed in a manner known in the art and this circuitry extends each trigger signal beyond the termination of the power-up pulse during which the trigger signal occurred. (Of course, the trigger signal would otherwise end with the termination of the power-up pulse.) That is, the circuitry 101A builds a "bridge" 102 following each trigger signal. The bridge exists only for the duration of the power-down pulse and terminates with the onset of the next power-up pulse. Thus, at the onset of this power-up pulse, if the object 21 has not moved, the trigger signal reappears and replaces the bridge 102. Accordingly, as far as an observer or detector can tell from the probe output signal 38 in FIG. 2, a continuous trigger signal has occurred.

However, if the object 21 has in fact moved, the trigger signal fails to appear upon the disappearance of the bridge 102. Accordingly, to the observer, a discontinuity in the trigger signal-bridge sequence occurs and this discontinuity indicates the motion of the object 21 away from the trigger point 6. Thus, monitoring of the trigger signal-bridge series allows one to ascertain the position of the object 21 with respect to the trigger point 6. (Circuitry known in the art can perform this monitoring function.)

The discussion above has been undertaken with reference to the withdrawal of the object 21 from the trigger point 6 in FIG. 1, yet without stating the precise distance 104 necessary to detrigger the probe 3. The Applicants have found that a distance of less than 0.0005 in. is sufficient to detrigger the probe 3 manufactured by Balluff as identified above. This distance 104 is termed an error margin.

The preceding discussion considered a proximity sensor or probe. A fixturing device incorporating such a sensor will now be described.

Figure 3:
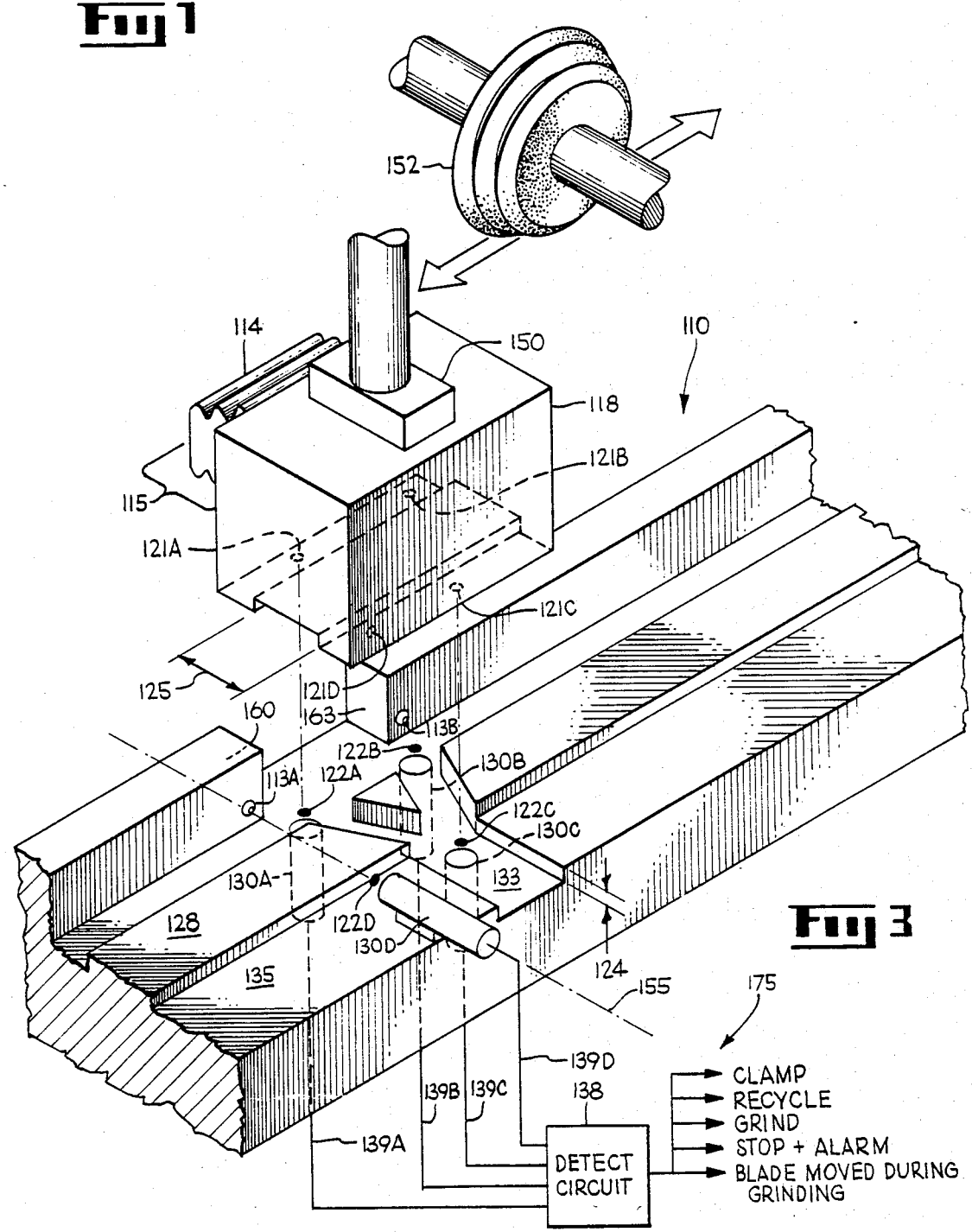
FIG. 3 depicts one form of the present invention.

FIG. 3 illustrates a vise 110 for supporting a gas turbine engine blade (not fully shown) during a grinding operation. The blade (the dovetail portion 114 of which only is shown) is encased in a casting 118 composed of a low melting point alloy. The casting 118 is of a precise configuration and the blade is accurately located within the casting 118 at a known position with respect to four reference points indicated as dashed circles 121A-D. Circles 121A-D are located on the bottom of the casting 118, while circle 121D is located on a side of the casting 118. The casting 118 contains a channel 125.

In a machining operation, the channel 125 fits over a rail 128 and, if the casting 118 is properly positioned, the four reference points 121A-D will be located at respective trigger points 122A-D of respective proximity probes 130A-D which are affixed to the vise 110. Each of these probes 130A-D is similar to the probe 3 in FIG. 1 and are similarly powered by a square wave generator similar to generator 35. In FIG. 3, the three probes 130A-C are positioned generally vertically and located at the bottom of a Y-shaped trough 133. Nozzles 113A-B direct a fluid such as compressed air through the trough 133 to remove debris. Debris which is generated by the grinding operation can accumulate atop the probes 13D-C. If the casting 118 is positioned over this debris and then clamped into position, damage to the probes can result. Fluid provided by the nozles 113A-B prevents this accumulation. The depth 124 of the trough 133 is such that the trigger points 122A-C are located at the level of the surface 135 of the vise 110. The fourth probe 130D positioned horizontally above the surface 135 of the vise 110.

In a machining operation, the casting 118 is tentatively positioned over the rail 128 by a human operator or a robot. The probe 130D senses the presence of the casting 118 and issues a signal to the detection circuitry 138 so indicating. In response, the detection circuitry 138 activates a clamping mechanism (not shown), known in the art, which drives a clamping foot 150 into contact with the casting 118. This positions the casting 118 against the vise 110. If the casting 118 is properly positioned, probes 130A-C are triggered and the detection circuitry 138 senses this and issues a signal for other apparatus (not shown) to begin grinding of the dovetail 114 by the grinding wheel 152. The grinding wheel 152 has a surface contour into which the dovetail 114 will be ground to conformity.

If the casting 118 is not properly positioned, at least one of the three probes 130A-C is not triggered and the detection circuitry 138 senses this. In response, the detection circuitry 138 issues a signal telling the clamping mechanism to release the casting 118 and to recycle. This recycling and sensing by probes 130A-D continues until the casting 118 is properly seated or until a predetermined number of attempts has been attained, such as three. After three attempts, cycling is terminated and an alarm summons an operator.

When the casting 118 is properly positioned, as indicated by the outputs of the probes 130A-D, it is then known that the three reference points 121A-C are positioned in a plane (not shown) defined by the three trigger points 122A-C subject to the error margin described above. Further, it is known that the reference point 121D is positioned along an axis 155 at a known position, namely, at the fourth trigger point 122D subject to the error margin. Thus, the only motion possible by the casting 118 without causing the occurrence of detrigger signals is motion along the rail 128. (It is known that, once an object triggers a probe such as probe 130D, the object can move without detriggering the probe, provided that some part of the object remains at the trigger point of the probe.) Motion along the rail 128 is restricted by stops 160 and 163 which straddle the dovetail 114 when the blade is in position. The small amount of motion allowed within this restriction is tolerable because the grinding wheel 152 moves parallel with the rail 128 to grind the dovetail 115. Thus, the precise positioning of the casting 118 along the rail 128 is thus not critical.

Figure 5:
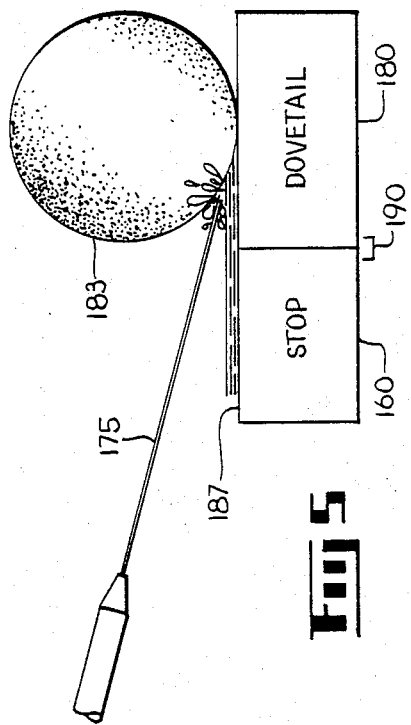
FIGS. 4 and 5 depict aspects of cutting fluid application in one form of the present invention.
Figure 4:
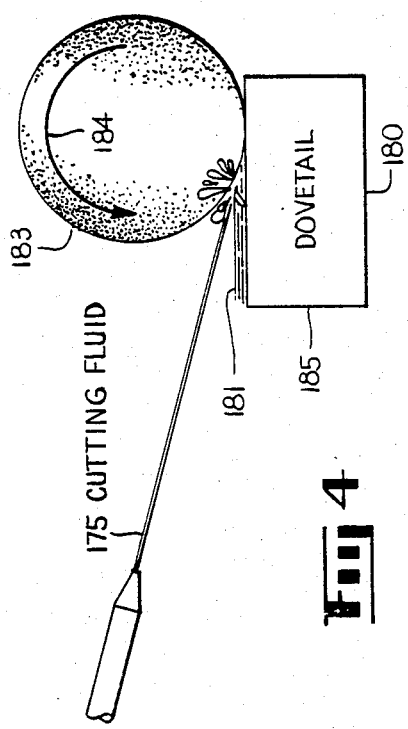

The stops 160 and 163 serve a function which is explained with reference to FIGS. 4 and 5. In FIG. 4, cutting fluid 175 is sprayed onto a dovetail 180 and forms a puddle 181 at the interface of the grinding wheel 183 and the dovetail. The rotation of the wheel 183, shown by arrow 184, draws fluid from the puddle 181 onto the dovetail. However, when the wheel 183 reaches the end 185 of the dovetail, no portion of the dovetail exists in front of the wheel to support the puddle and little or no fluid is drawn onto the dovetail. In order to mitigate this problem, stop 160 acts as a surrogate dovetail for supporting the puddle. The top 187 of the top 160 preferably has a shape which mates that of the wheel 183. The distance 190 between the stop 160 and the dovetail 180 is preferably as small as possible, and preferably zero inches. Thus, the stop 160 assists in supplying cutting fluid to the dovetail.

The accidental dislocation of the casting 118 following triggering of all the probes 130A-D such that one or more probes becomes detriggered indicates that the casting has become misaligned and that a machining operation should not yet be performed on the dovetail 115. If at any time prior to completion of the clamping operation the casting 118 should move and detrigger any probe, the circuitry 138 detects this detriggering in a manner known in the art and deactivates the clamp. As discussed above, detriggering (i.e., the occurrence of situation S2) is detected through the detection of a power-up pulse without a trigger pulse.

If the casting 118 should move during a grinding operation, a detrigger signal occurs, but the clamp foot 118 is not released from the casting 118, as this could be dangerous. Instead, a signal, such as "Blade Moved During Grinding," is given to indicate the possibly bad grinding of the current blade. The various signals generated by the detection circuitry 138 are indicated as signals 175 in FIG. 3.

Applicants believe that, in proximity probes generally, hysteresis is intentionally built into the probes to prevent instability which would otherwise occur at the trigger point. The instability tends to produce chatter or bounce in the probe's output, and this phenomenon is known in the art. One method of reducing the chatter is to provide positive feedback, such as by a well known Schmitt trigger, so that, once the first switching occurs (that is, at the very first instance of chatter), the trigger point is, in effect, dislocated in space. This dislocation is shown in FIG. 1 wherein the trigger point 6 is moved from point 6 to point 9. Detriggering does not occur until the dislocated, detrigger point is reached.

Applicants partially defeat this hysteresis by deactivating the positive feedback network through switching the power supplied to the probe off and on at the rate of 40 Hz. Turning the power off resets the Schmitt trigger. This 40 Hz switching has the effect of resetting the positive feedback network every 1/40 second. At each resetting, the probe becomes sensitive to the trigger point 6 in FIG. 1, and not the detrigger point 9, and this is true irrespective of whether the probe 3 has been previously triggered. If it has been triggered, and if the object 21 has not moved away from the trigger point 6, then upon resetting of the positive feedback network, a trigger signal immediately reappears. If the object 21 has moved away from the trigger point 6 a distance equal to or greater than the error margin 104, then upon resetting no trigger signal appears from the probe 3. From one point of view, this resetting of the positive feedback network amounts to a removal (or reduction) of the hysteresis for an instant.

As an example, a Schmitt trigger having a threshold voltage of 3 volts is assumed. The output of a proximity probe is applied to the Schmitt trigger and when this output rises from one volt to three volts, the Schmitt trigger is triggered and, simultaneously, positive feedback reduces the threshold to a lower voltage such as one volt. At this time, the probe output is two volts beyond the threshold and, for detriggering to occur, the probe output must retrace itself to the new one-volt level. The original three-volt threshold corresponds to the trigger point 6 in FIG. 1 and the reduced one-volt threshold corresponds to the detrigger point 9. Accordingly, the hysteresis region 26 corresponds to the two-volt change in the threshold.

In the embodiment described in connection with FIG. 2, the probe's power supply was switched on and off at the rate of 40 Hz. It is believed that this deactivated the positive feedback network in the probe 3 with the result that, upon reactivation, the threshold is set at its original value, e.g., three volts in the example above. If an object is present at the trigger point 6 at this time, the positive feedback network is immediately triggered, changing the threshold voltage as described above.

Of course, deactivation of the entire positive feedback network is not strictly necessary to reset the threshold to its original value. Thus, from one point of view, the present invention compares the output of a transducer, such as a proximity probe sensing an object, with a threshold. When the output attains a predetermined relationship to the threshold, a trigger signal (such as the presence signal in FIG. 2) is generated, and the threshold is changed. At a later time, the threshold is reset to a third value, which is preferably the same as the first. If the object has not moved from the position at which the trigger signal was produced, the trigger signal reappears. If the object has moved, the trigger signal does not reappear.

The hysteresis reduction of the present invention has been described in connection with a position transducer. However, the present invention is not limited to such transducers: it can be applied to many sensors having hysteresis in the form of the alteration of a threshold when an input signal attains the threshold. (In the case of the Schmitt trigger described above, the alteration is such that, upon attainment of the threshold by the input signal, the threshold is driven well below the input to place the input well past the threshold.) Following alteration of the threshold, the present invention restores the threshold to its initial value (or some other value), and preferably repeatedly at a known rate, in order to ascertain whether the input signal remains at the initial threshold (or at the other value). If so, the threshold will be altered again upon triggering of the sensor. If not, the sensor is not retriggered.

An invention has been disclosed in which an inductive proximity probe is switched on and off at the rate of 40 Hz in order to reduce the effects of hysteresis and to thereby create sensitivity to motion of an object within the probe's hysteresis region. Several such probes are used in a vise which clamps an object for a machining operation. The probes constantly monitor the object to ascertain whether the object is located in a predetermined position so that accurate machining is obtained. If the probes detect dislocation of the object, a clamping procedure is reinitiated a specified number of times in the attempt to correct the situation. Failing success in correction, an operator is summoned by an alarm.

Numerous substitutions and modifications can be undertaken without departing from the true spirit and scope of the present invention. In particular, a switching rate of 40 Hz which is disclosed is not viewed as essential: other rates can be used.

What is desired to be secured by Letters Patent is the following.

We claim:

1. Apparatus for positioning a workpiece supported by a casting having a plurality of reference points defined thereon, the casting having a channel, comprising:
    (a) a plurality of sensing means, each for producing a signal in response to the crossing of the trigger point of the sensing means by one of the reference points, and each sensing means having hysteresis;
    (b) hysteresis reduction means for removing the hysteresis at predetermined points in time; and
    (c) control means
        (i) coupled to the sensing means for receiving the trigger signals,
        (ii) coupled to the hysteresis reduction means for receiving information as to the predetermined time intervals, and
        (iii) for activating a clamping means in response to the signals of (i) and information of (ii) for clamping the casting to the apparatus.

2. Apparatus according to claim 1 and further comprising:
    (d) a rail for engaging with the channel of the casting for limiting motion of the casting in all directions except one and
    (e) stop means for restricting the travel of the casting in the one direction of (d).

3. Apparatus according to claim 2 in which the trigger points of three of the sensing means define a plane and a fourth trigger point is displaced a predetermined distance away from the plane.

4. Apparatus according to claim 3 and further comprising at least one fluid orifice for directing a stream of fluid for removing debris from the region of at least one sensing means.

5. Apparatus according to claim 1 in which the sensing means comprise inductive proximity probes.

* * * * *